United States Patent
Ovsiankin et al.

(10) Patent No.: US 9,413,838 B1
(45) Date of Patent: Aug. 9, 2016

(54) SECOND-PASS RANKER FOR PUSH NOTIFICATIONS IN A SOCIAL NETWORK

(71) Applicant: LinkedIn Corporation, Mountain View, CA (US)

(72) Inventors: Alexander Ovsiankin, Sunnyvale, CA (US); Daniel Wong, San Jose, CA (US); Rishi Jobanputra, Menlo Park, CA (US); Rupesh Gupta, Sunnyvale, CA (US); Ravi Kiran Holur Vijay, Mountain View, CA (US); Hsiao-Ping Tseng, Fremont, CA (US); Joshua Daniel Hartman, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/788,132

(22) Filed: Jun. 30, 2015

Related U.S. Application Data

(60) Provisional application No. 62/110,283, filed on Jan. 30, 2015.

(51) Int. Cl.
*G06F 15/16* (2006.01)
*H04L 29/08* (2006.01)

(52) U.S. Cl.
CPC .............. *H04L 67/26* (2013.01); *H04L 67/303* (2013.01)

(58) Field of Classification Search
CPC .... G06Q 10/107; H04L 12/585; H04L 12/58; H04L 29/06; H04L 12/581; H04L 12/5855
USPC ....................................................... 709/206
See application file for complete search history.

(56) References Cited

U.S. PATENT DOCUMENTS

| 8,930,503 B1* | 1/2015 | Vaideeswaran | ......... H04L 61/15 709/217 |
| 2010/0004977 A1* | 1/2010 | Marci | .............. H04N 21/44218 705/7.32 |
| 2014/0006501 A1* | 1/2014 | Li | ....................... G06Q 30/0269 709/204 |
| 2014/0180798 A1* | 6/2014 | Bailey | ................ G06Q 30/0277 705/14.45 |
| 2014/0207564 A1* | 7/2014 | Dubey | ................... G06Q 30/02 705/14.43 |
| 2015/0039418 A1* | 2/2015 | Baluja | ................ G06Q 30/0246 705/14.45 |
| 2015/0067061 A1* | 3/2015 | Poston | .................... H04L 67/36 709/204 |

(Continued)

FOREIGN PATENT DOCUMENTS

| CA | 2786850 A1 * | 7/2011 | ............. G06Q 10/10 |
| WO | WO 2012012298 A2 * | 1/2012 | ......... G06Q 30/0241 |

(Continued)

*Primary Examiner* — Kostas Katsikis
(74) *Attorney, Agent, or Firm* — Schwegman Lundberg & Woessner, P.A.

(57) ABSTRACT

Systems and methods for providing push notifications of social network content items include determining first and second engagement values for first and second content items, respectively, provided by first and second content item sources, respectively, based on previous interactions with content items. First and second utility values are determined for the first and second content items, respectively, based on a mathematical operation applied to the first and second engagement values, respectively, the first and second selection metrics, respectively, and, for the first utility value, the value metric. One of the first and second content items are determined as a push content item based on a difference between the first and second utility values and displayed on a user device.

20 Claims, 7 Drawing Sheets

(56) References Cited

U.S. PATENT DOCUMENTS

| | | | | |
|---|---|---|---|---|
| 2015/0081449 A1* | 3/2015 | Ge | ................... | G06F 17/30867 705/14.66 |
| 2015/0100415 A1* | 4/2015 | Yu | ...................... | G06Q 30/0251 705/14.49 |
| 2015/0332314 A1* | 11/2015 | Chakraborty | .......... | G06Q 50/01 705/14.45 |
| 2015/0339754 A1* | 11/2015 | Bloem | .............. | G06F 17/30867 705/26.7 |
| 2015/0379563 A1* | 12/2015 | Franosch | ........... | G06Q 30/0275 705/14.46 |
| 2016/0044127 A1* | 2/2016 | Filner | ................. | H04L 67/2847 709/213 |

FOREIGN PATENT DOCUMENTS

| | | | | |
|---|---|---|---|---|
| WO | WO 2013165306 A2 * | 11/2013 | .............. | G06F 3/041 |
| WO | WO 2014018664 A2 * | 1/2014 | ......... | G06Q 30/0246 |

* cited by examiner

SECOND-PASS RANKER FOR PUSH NOTIFICATIONS IN A SOCIAL NETWORK

PRIORITY

This application claims the benefit of priority to U.S. Provisional Application No. 62/110,283, "SOCIAL NETWORK CONTENT FEDERATION", filed Jan. 30, 2015, which is incorporated by reference herein in its entirety.

TECHNICAL FIELD

The subject matter disclosed herein generally relates to the federation of content from multiple content sources in a social network.

BACKGROUND

Social networks conventionally obtain content items from multiple content item sources. The content items as obtained may then be displayed to users of the social network on a user interface, such as a news stream, dedicated windows or spaces on a visual display, separate windows, and the like. Content item sources may include user profiles and changes thereto stored by the social network, entities that provide sponsored content or databases in which the content items are stored, and organic content recommendation engines, such as engines that provide particular types of content, including job recommendations, recommended connections with members of the social network, and content that other members and users of the social network have found interesting.

BRIEF DESCRIPTION OF THE DRAWINGS

Some embodiments are illustrated by way of example and not limitation in the figures of the accompanying drawings.

DETAILED DESCRIPTION

Figure 1:
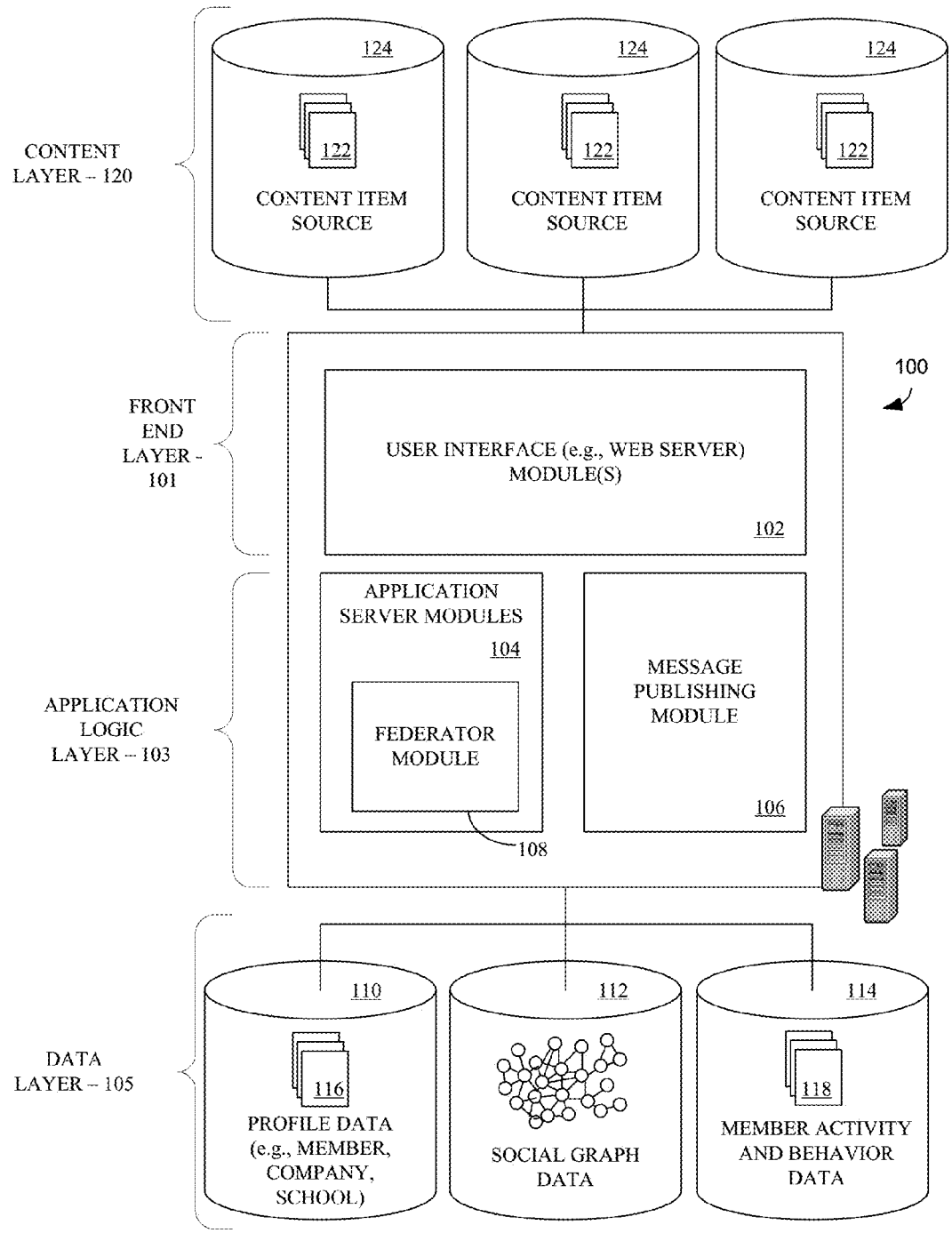
FIG. 1 is a block diagram illustrating various components or functional modules of a social network system, consistent with some examples.

Example methods and systems are directed to providing push-notifications of content from multiple content sources in a social network. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In various examples of social networks, the sources of content items may provide content items to be displayed on a user interface based on criteria, the combination of which are unique to the content item source or which are not necessarily common to all of the content item sources. Thus, for instance, a sponsored content item source may factor in criteria such as an amount that a sponsoring entity has bid to display a sponsored content item to a user while a job recommendation engine may utilize criteria that focus on a user's qualifications for the job and the user's current employment status. Such diverse content item sources with selection criteria that are specific to the content items provided by the various individual content item sources may contribute to a rich and diverse user experience with the social network.

However, such arrangements may not be sensitive to the quality of the content item sources and the need or desire to balance the display of the content items obtained therefrom appropriately. In particular, if a content item source has relatively poor selection criteria as a first-pass ranker of the content items included therein then the content items provided by the content item source may be of similarly poor quality or relevance to the user to whom the content items are displayed. Furthermore, a single content item source may provide more content items than are necessarily desired without the capacity for the social network provider to understand if the large numbers of content items are desirable because they are highly relevant to the user or undesirable because they are of poor or middling quality, in which case their sheer number may overwhelm other content items in a feed or may otherwise diminish the experience of the user.

A content source second-pass ranker has been developed that may address the above issues, among others, by obtaining content items from the various content item sources according to the individual content item sources' own first-pass ranker selection criteria. The second-pass ranker, acting as a federator for the various content item sources, assesses some or all of the content item sources for relative quality and/or reliability of the content item sources' first-pass rankers and adjust the perceived value of the content items received from the respective content item sources accordingly. The second-pass ranker may then provide the content items received from the individual content item sources as push-notifications to members of the social network according to the adjusted value of the content items and according to any of a variety of considerations that may reflect on what content items are presented to the users of the social network.

FIG. 1 is a block diagram illustrating various components or functional modules of a social network system 100, consistent with some examples. A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. An application logic layer 103 includes various application server modules 104, which, in conjunction with the user interface module(s) 102, may generate various user interfaces (e.g., web pages, applications, etc.) with data retrieved from various data sources in a data layer 105. In some examples, individual application server modules 104 may be used to implement the functionality associated with various services and features of the social network service. For instance, the ability of an organization to establish a presence in the social graph of the social network system 100, including the ability to establish a customized web page on behalf of an organization, and to publish messages or status updates on behalf of an organization, may be services implemented in independent application server modules 104. Similarly, a variety of other applications or services that are made available to members of the social network service may be embodied in their own application server modules 104. Alternatively, various applications may be embodied in a single application server module 104. In some examples, the social network system 100 includes a content item publishing module 106, such as may be utilized to receive content, such as electronic messages, posts, links, images, videos, and the like, and publish the content to the social network.

One or more of the application server modules 104, the content item publishing module 106, or the social network system 100 generally may include a federator module 108. As will be disclosed in detail herein, the federator module 108 may allow for content items from multiple content item sources to be combined into a single feed for transmission to and/or display on a user interface of a member or user of the social network.

The federator module 108 may be implemented on a separate server or may be part of a server that provides other portions of the social network system 100. As such, the federator module 108, in various examples, incorporates any of the hardware and/or software components that are or may be included in a server or other computing device conventionally known in the art, including one or more processors, electronic data storage devices, network interfaces, user input devices, electronic memory, and so forth. Thus, it is to be understood that while the federator module 108 is described as an integral component of a social network, the principles described herein may be applied without the federator module 108 being an integral part of a social network or even necessarily utilizing data from a social network if content items 122 are available from alternative sources.

As illustrated, the data layer 105 includes, but is not necessarily limited to, several databases 110, 112, 114, such as a database 110 for storing profile data 116, including both member profile data as well as profile data for various organizations. Consistent with some examples, when a person initially registers to become a member of the social network service, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the social network service, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social network service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within the social graph database 112.

Activities by users of the social network system 100, including past searches that have been conducted by the federator module 108, may be logged as activities 118 in the activity and behavior database 114. Such activities may include search terms, interactions with search results and subsequent engagement with the subject of search results, scores assigned to such search terms, as disclosed herein, communication with others via the social network, engagement with content items posted on the social network, joining groups, following entities, and so forth.

The data layer 105 collectively may be considered a content item database, in that content items 120, including but not limited to member profiles 116, may be stored therein. Additionally or alternatively, a content item layer 120 may exist in addition to the data layer 105 or may include the data layer 105. The content item layer 120 may include individual content items 122 stored on individual content item sources 124. The member profiles 116 and the activities 118 may be understood to be content items 122, while the profile database 110, the social graph database 112, and the member activity database 114 may also be understood to be content item sources 124. Content items 122 may further include sponsored content items as well as posts to a feed, articles or links to websites, images, sounds, event notifications and reminders, recommendations to users of the social network for jobs or entities to follow within the social network, and so forth.

The content item sources 124 may be separately implemented on individual servers. In an example, each content item source 124 includes a separate processor or processing resources and separate electronic data storage. In such an example, as will be disclosed in detail herein, each content item source 124 utilizes its own processing resources to access its own electronic data storage and output content items 124 to the federator module 108. Additionally or alternatively, some or all of the content item sources 124 may utilize a common processor or processing resources and may access a common electronic data storage for content items 122 to transmit the federator module 108. In such an example, the various content item sources 124 may represent logical divisions of common processing, electronic data storage, and other hardware assets incident to the provision of content items 122 as disclosed herein. It is noted and emphasized that other suitable configurations and arrangements are contemplated as appropriate.

The social network service may provide a broad range of other applications and services that allow members the opportunity to share and receive information, often customized to the interests of the member. For example, with some examples, the social network service may include a photo sharing application that allows members to upload and share photos with other members. With some examples, members may be able to self-organize into groups, or interest groups, organized around a subject matter or topic of interest. With some examples, the social network service may host various job listings providing details of job openings with various organizations.

Although not shown, with some examples, the social network system 100 provides an application programming interface (API) module via which third-party applications can access various services and data provided by the social network service. For example, using an API, a third-party application may provide a user interface and logic that enables an authorized representative of an organization to publish messages from a third-party application to various content streams maintained by the social network service. Such third-party applications may be browser-based applications, or may be operating system-specific. In particular, some third-party applications may reside and execute on one or more mobile devices (e.g., phone, or tablet computing devices) having a mobile operating system.

Figure 2:
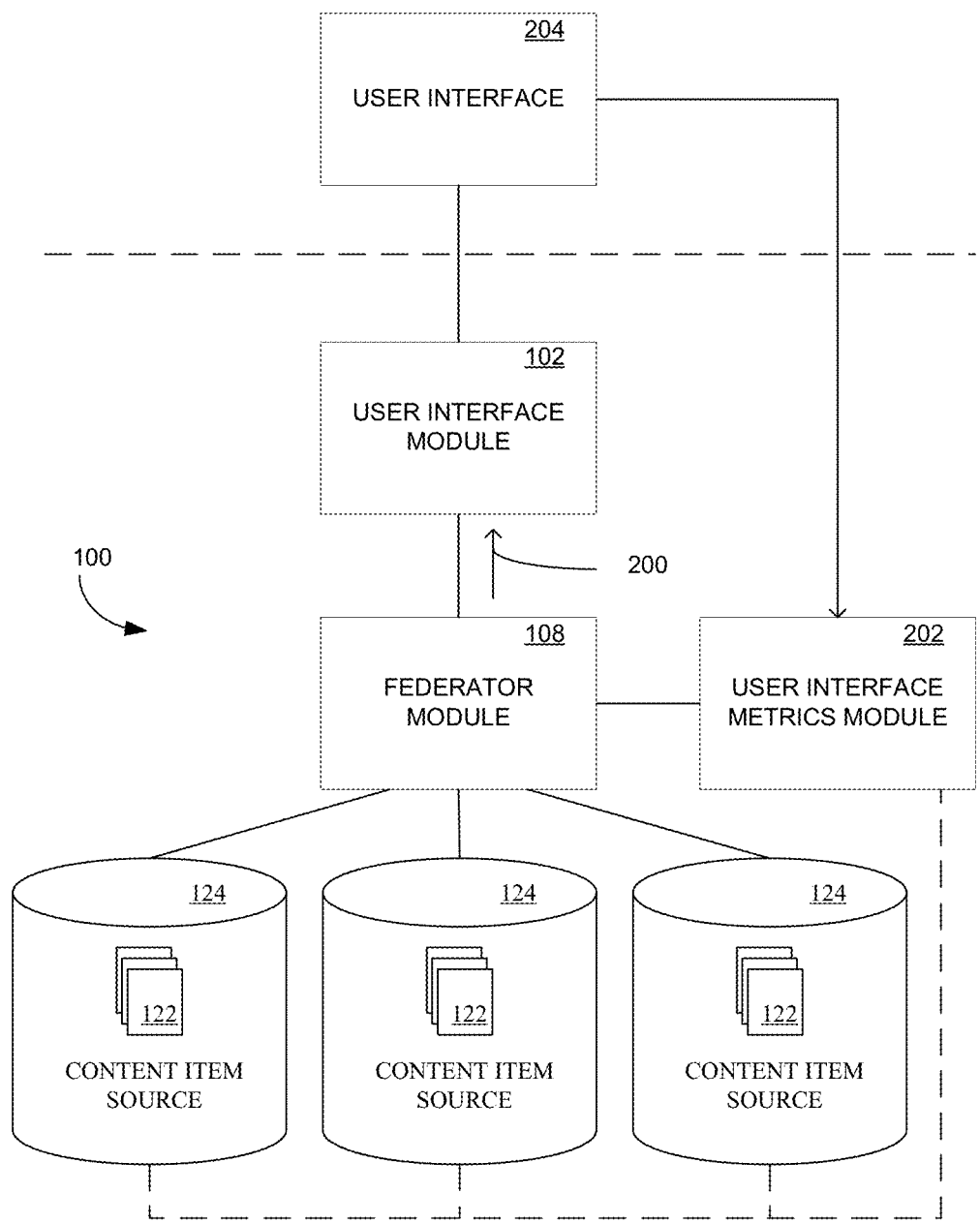
FIG. 2 is a simplified illustration of a social network system including content item sources in relation to the federator module, in an example embodiment.

FIG. 2 is a simplified illustration of the social network system 100 including the content item sources 124 in relation to the federator module 108, in an example embodiment. The social network system 100 allows for the content item sources 124 to be combined into a single feed for transmission to and/or display on a user interface of a member or user of the social network. The social network system 100 further allows for the content items 122 to be displayed as push notifications on a user interface. In an example, some or all of the content item sources 124 are implemented as an API, such as an http API.

The content item sources 124 may rank the content items 122 stored therein according to the ranking parameters of the content item source 124. Such content item sources 124 may include content item sources disclosed in U.S. Patent Application Publication No. 2014/0143163, "USER CHARACTERISTICS-BASED SPONSORED JOB POSTINGS", U.S. Patent Application Publication No. 2014/0143323, "USER CHARACTERISTICS-BASED SPONSORED COMPANY POSTINGS", and U.S. Patent Application Publication No. 2015/0039406, "INDEPENDENT TARGETED SPONSORED CONTENT MANAGEMENT SYSTEM AND METHOD", all of which are incorporated by reference herein in their entirety. The content item sources 124 may thus function as first-past rankers of the content items 122 stored therein or obtained thereby.

In various examples, the content item sources 124 provide content items 122 on the basis of a request from the federator module 108 for content items 122. In such examples, the federator module 108 may request a predetermined number of content items 122 from some or all of the content item sources 124 or may simply request content items 122, in response to which the content item sources 124 may provide as many content items 122 as each content item source 124 deems appropriate given their own respective criteria. In various examples, the content item sources 124 may also provide content items 122 to the federator module 108 for provision on a user interface of a user without being prompted by the federator module 108. In various examples, such "pushed" content items 122 may be incorporated into a feed or as push notifications or separate messages on the target user's user interface.

The federator module 108 may rank the content items 122 provided to the federator module 108 by the content item sources 124. As such, the federator module 108 may function as a second-pass ranker. Based on the content items 122 as ranked by the federator module 108, the federator module 108 may produce as output a content item 122 stream 200 that may be an http API or any of a variety of other suitable formats known in the art. The content item stream 200 may be utilized by the messaging publishing module 106 and/or the user interface module 102 to provide the output to the user interface of the user or member.

A protocol may be defined between the federator module 108 and the content item sources 124. The federator module 108 may utilize the protocol to make requests to the content item sources 124 for ranked content items 122 from some or all of the sources 124. The requests may be according to a conventional http protocol. The content item sources 124 may similarly respond according to a conventional http data transfer.

The content item sources 124 may include or may be modified to include one or more files or programs that allow the ranked content items 122 to be transmitted and formatted according to the protocol. In an example, an object notation standard may be utilized to generate the data transfer of ranked content items 122. In an example, the JavaScript Object Notation (JSON) standard may be utilized. Libraries that may programmatically generate libraries that may read, validate, serialize, and deserialize the data transfer into language specific data structures. In the above example utilizing the JSON standard, the data structures may be Java objects.

As such, the one or more files or programs may include a product specification file that may be incorporated into a trunk directory of one or more of the content item sources 124. Additionally, a project build file may likewise be incorporated. A common key, in the above example a JSON coordinate, may be utilized between the product specification file and the project build file.

A user interface metrics module 202 may identify content items 122 that produce or do not produce a user interaction with the content item 122 when displayed on a user interface 204 of a user device. In various examples, if a user interacts with a content item 122 as displayed on the user interface 204, such as by clicking a link, sharing the content item 122, commenting on the content item 122, and so forth, the user interface metrics module 202 variously either receives the interaction directly or receives an indication of the interaction. For instance, receiving the interaction itself may be to receive the text of a comment that was entered while receiving an indication of the interaction may be to receive a notice that a comment was entered without receiving the comment itself. The user interface metrics module 202 is optionally coupled to the content item sources 124 and may save the interactions as received, such as in the activities database 114.

The social network system 100 may provide content items 122 to the user interface 204 in a federating mode and a testing mode. The social network system 100 may switch between modes from time to time and from user to user. Thus, some users may receive content items 122 as provided by the federator module 108 and other users may receive content items 122 with the operation of the federator module 108 reduced or disabled altogether. In the testing mode, as will be discussed in detail herein, the impact of the operations of the content item sources 124 and their function as first-pass rankers may be assessed using the user interface metrics module 202 by varying the display of content items 122 on the user interface 204. In the federating mode the federator module 108 may utilize the assessments provided by the user interface metrics module 202 to determine the relative effectivity of the content item sources 124 at assessing the content items 122 stored thereon and adjust the resultant display of content items 122 on the user interface 204.

The testing mode may be selectively applied to particular components of the social network system 100 to obtain particular information, as disclosed herein. In various examples, individual content item sources 124 may be selectively placed in testing mode and their output randomly or varyingly presented to the user while the output of other content item sources 124 may be presented to users according to federation policies implemented by the federator module 108. In such examples, newly added or modified content item sources 124 may be dynamically tested and their results compensated for, as disclosed herein, while other content item sources 124, such as those that have already been assessed in the testing mode and incorporated into the federation protocol as disclosed herein may operate statically outside of the testing mode.

Figure 3:
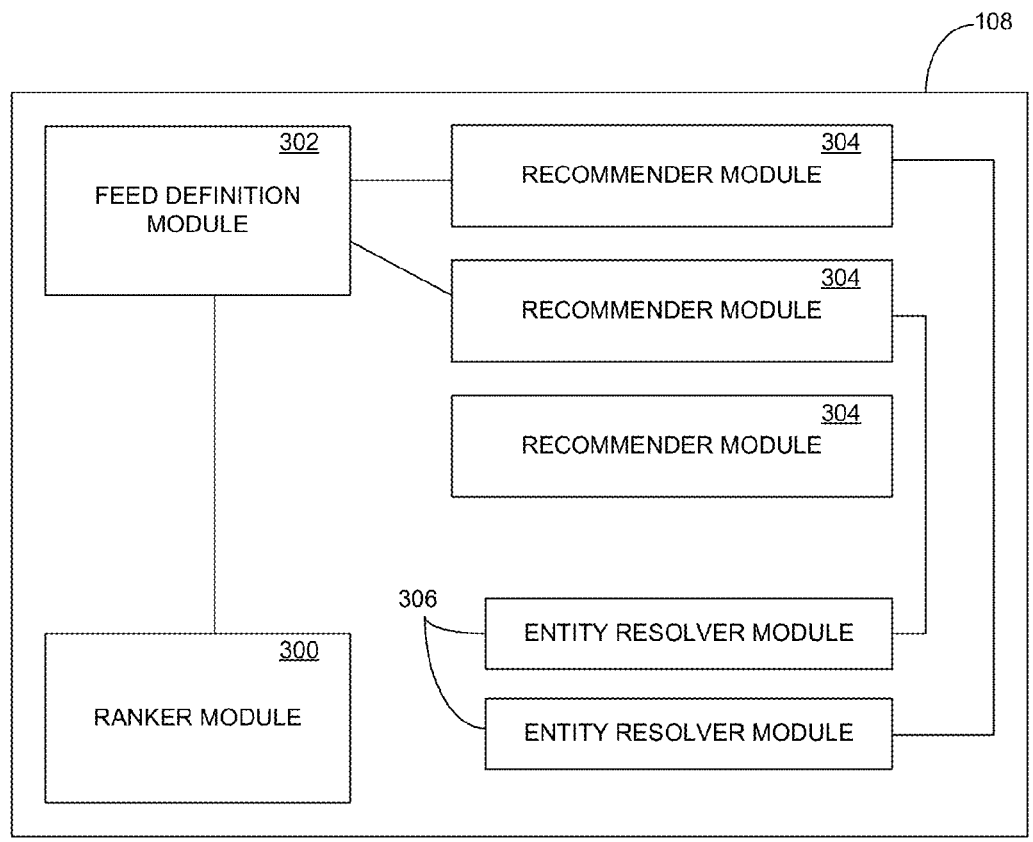
FIG. 3 is a detailed block diagram of a federator module, in an example embodiment.

FIG. 3 is a detailed block diagram of the federator module 108, in an example embodiment. In such an example, the federator module 108 is a separately implemented http server with various modules and/or sub-modules utilizing the resources of the http server. The federator module 108 includes a ranker module 300, a feed definition module 302, recommender modules 304, and entity resolver modules 306. Some or all of the various modules 300, 302, 304, 306 may be separately implemented files operated on a processor of the server. Additionally or alternatively, the various modules 300, 302, 304, 306 may be divided between and among multiple servers. Thus, in various examples, the federator module 108 itself may be divided or distributed among multiple servers and multiple processors or processing hardware configurations and among multiple electronic data storage elements.

The ranker module 300 may obtain collections of content items 122 provided from the content item sources 124 as specified by the feed definition module 302. The ranker module 300 may de-duplicate the content items 122 from the various sources 124, may perform a second-pass or global ranking of the content items 122, and may provide the result as the output of the federator module 108.

The feed definition module 302 may provide the content items 122 or cause the content items 122 to be provided to the ranker module 300. The feed definition module 302 may map an identifier of the feed to be output to the recommender modules 304 and the ranker module 300. Thus, content items 122 may be identified in the recommender modules 304 and provided to the ranker module 300 based on the identifier.

The recommender modules 304 may define a mapping between the content item sources 124 and a recommender that will provide content items 122 based on a request for content items 122 to be provided and one or more of the resolver modules 306. The resolver modules 306 may optionally covert a format of content items 122 as obtained from the content item sources 124 to a common format.

Figure 4A:
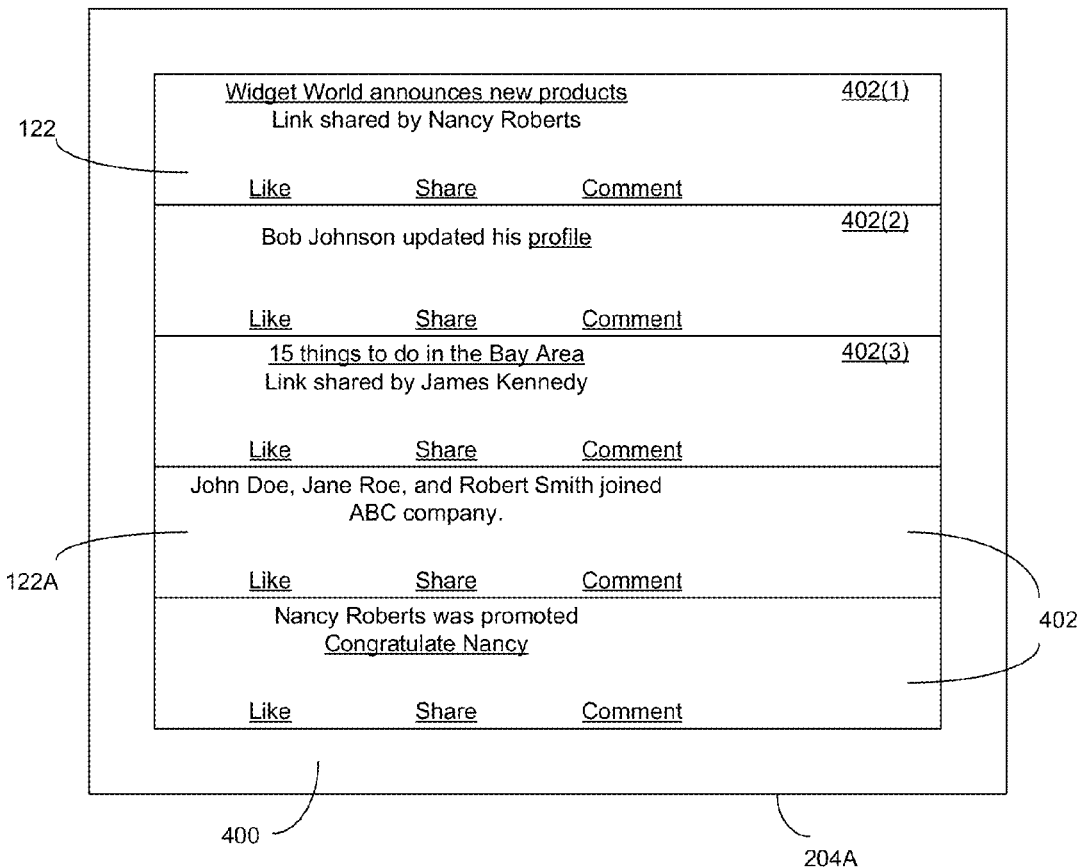
FIGS. 4A and 4B are a simplified images of user interfaces as provided by a social network system, in an example embodiment.
Figure 4B:
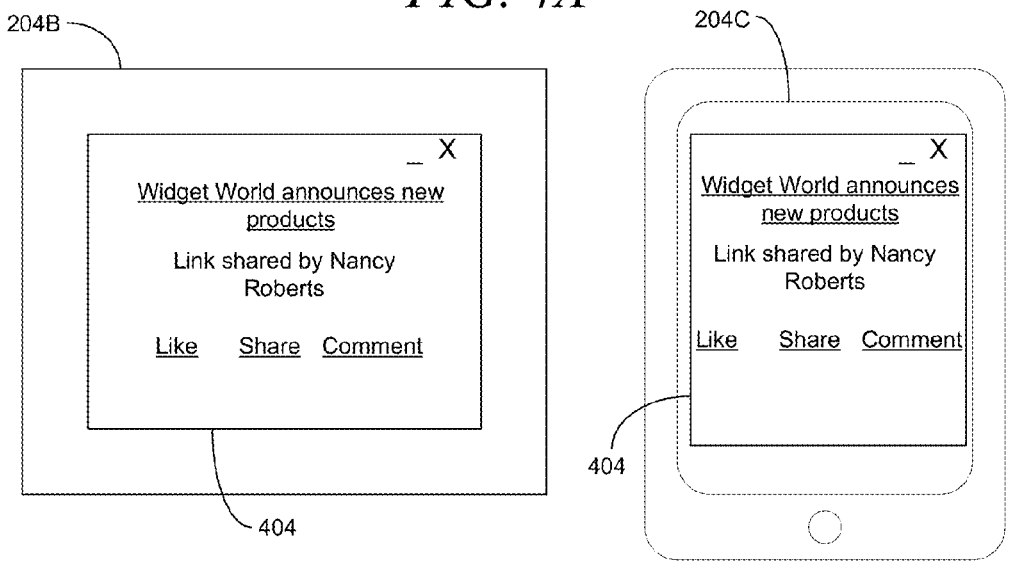

FIGS. 4A and 4B are simplified depictions of a user interface 204 as provided by the social network system 100, in an example embodiment. The user interface 204A of FIG. 4A includes a feed 400 that includes multiple individual positions 402 arranged, in this example, in a vertical list with a first position 402(1) at the top and lower positions sequentially down the list. Each position 402 includes space to display content related to the content item 122; in various examples, the content item 122 itself may be displayed, for instance if the content item 122 is a link or a renderable image, or data relating to the content item 122 may be displayed, such as if the content item 122 needs to be reformatted for the user interface 204A or the circumstances in which the user interface 204A is being displayed. It is to be recognized that the user interface 204A is provided for the purposes of an example and that many additional configurations of user interfaces 204A are contemplated and may be utilized consistent with the principles described herein.

The social network system 100 may operate in the testing mode described above by obtaining content items 122 from the content item sources 124 and displaying the content items 122 on the user interface 204A without respect to the federator module 108. As such, the content item sources 124 may function in their first-pass ranker mode without second-pass ranking provided by the federator module 108. In various examples, the content items 122 may still pass through the federator module 108, as illustrated in FIG. 2, but the second-pass ranking function of the federator module 108 may be disabled.

In an example, at least one of the federator module 108 and the message publishing module 106 call to a content item source 124 to obtain at least one content item 122 for display on the user interface 204A. The content item 122 may then be displayed in a particular position 402 of the feed 400. In an example, the position 402 is randomly selected or pseudo-randomly selected. In an example, the content item 122 may be displayed on multiple user interfaces 204A corresponding to multiple different users. In such an example, a given content item 122 may be iteratively moved from position 402 to position 402 when it is displayed on multiple user interfaces 204A so as to sequentially be positioned in a variety of positions 402 over time. Additional content items 122 may be obtained from various content item sources 124 and positioned randomly or varyingly in positions 402 in the various user interfaces 204A so as to fill out the positions 402 of the feed 400.

In addition to the content items 122 themselves, the content item sources 124 may provide the first-pass ranking details of each content item 122 to the user interface metrics module 202. It is noted and emphasized that, in the testing mode, the content items 122 as provided may not necessarily be placed according to the first-pass ranking provided by the content item sources 124. However, the data from the first-pass ranking may be utilized by the user interface metrics module 202 to assess the quality of the first-pass ranking of the various content item sources 124.

As displayed on the various user interfaces 124, the content items 122 may be interacted with, as disclosed herein. The user interface metrics module 202 may note those interactions for each content item 122 and/or the lack of interactions thereof. In various examples, the user interface metrics module 202 may also optionally note the position 402 in which the content item 122 was displayed when it was or was not interacted with. It is noted that the position 402 may be superfluous if the content item 122 is displayed randomly or sequentially varying on a relatively large number of user interfaces 204A.

For a given content item 122 as displayed on user interfaces 204A, the user interface metrics module 202 may note the rate at which the content item 122 was the subject of a user interaction in comparison with the first-pass ranking that the content item source 124 provided for the content item 122. The user interface metrics module 202 may compare those figures with the expected interaction performance of a content item 122 that has been placed in the positions in which the given content item 122 has been placed.

The various content item sources 124 may perform first-pass ranking and other assessments according to schemas that are not consistent among all of the content item sources 124. Thus, in an example, a first content item sources 124 may operate according to a first selection schema that seeks to determine a selection metric indicative of the likelihood that a given content item 122 will be interacted with by a user. The first content item source 124 may further operate according to a first value schema that seeks to determine a value metric of a content item 122 as if the content item 122 were a piece of sponsored content. It is noted that, if the content item 122 is, in fact, a piece of sponsored content, and the content item source 124 is, for instance, an advertising index, the actual bid for the sponsored content item may be the value metric. The value metric may, in various examples, be a value in a currency, such as United States dollars or other national or international currency.

In contrast to the first content item source 124, the second content item source 124 may operate according to a second selection schema different from the first selection schema and a second value schema different from the first value schema. Most generally, selection schemas and value schemas may differ between content item sources 124 if the same content item 122 receives a different selection metric when run against the first selection schema and the second selection schema. It is to be noted, however, that most or all content items 122 may only be run against one selection schema and one value schema because content items 122 may tend only to be stored in one content item source 124.

For instance, in the illustrative example, for a sample content item 122, the content item source 124 may provide a first-pass rank that suggests that the content item 122 is at the seventy-fifth ($75^{th}$) percentile for likely user interaction and should optimally be placed in the third position 402(3). In the example, the user interface metrics module 202 has previously determined that, on average, a content item 122 randomly placed in the feed 400 that is expected to be in the seventy-fifth percentile and/or is placed in the third position 402(3) is interacted with by a user, on average, eleven (11) percent of the time. In the illustrative example, the user interface metrics module 202 determines that, overall, the sample content item 122 is interacted with thirteen (13) percent of the time both overall and in the third position 402(3).

On that basis, the user interface metrics module 202 may determine that the content item source 124 that provided the content item 122 understates or underestimates the likely performance of the content items 122 it ranks. The user interface metrics module 202 may perform the testing mode analysis on multiple content items 122 from multiple content item sources 124. Ultimately, the user interface metrics module 202 may characterize some or all of the content item sources 124 according to the degree by which the content item sources 124 overestimate or underestimate the likely user interaction with the content items 122 the content item source 124 provides. Thus, for the content item source 124 that provided the sample content item 122 referenced above, the user interface metrics module 202 may utilize dozens or more content items 122 from the content item source 124 to determine that the content item source 124 consistently underestimates the user engagement rate for the content items 122 it provides by two (2) percentage points. Other content item sources 124 may be determined to overestimate by various percentages or be essentially accurate in their assessments.

In the federating mode, the federator module 108 may obtain, from the various content item sources 124, content items 122 and an associated selection metric and an associated value metric for each content item 122. The federator module 108 may request a predetermined number of content items 122 from some or all of the content item sources 124 or the content item sources 124 may individually determine how many content items 122 to send to the federator module 108. It is to be further recognized that the content item sources 122 may, at least initially, transmit a list or index of content items to the federator module 108 at least until the content items 122 are selected by the federator module 108 for display on the user interface 204A, upon which point the content items 122 themselves may be provided.

The federator module 108 may further obtain, from the user interface metrics module 202, indications of the interactions with the content items 122 from the various content item sources 124. The indications of the interactions may be on the basis of individual content items 122 that have been tested in the testing mode or on the basis of complete content item sources 124 that have been tested in the testing mode.

The federator module 108 may determine an engagement value for each of the content items 122 based on the data from the user interface metrics module 202. The engagement value may be representative of the inherent value of the content itself to the social network without respect to any money the content item 122 may actually earn for the social network system 100. Put another way, the engagement value may reflect the overall value to the social network of having good content to drive traffic to the social network without respect to directly making money off of that content.

The engagement value is based on normalized, expected interactions with the content item 122 in question. Different interactions may have different value, as disclosed herein. Thus, an expected viewing of a link in the content item 122 may be worth 0.01, an expected comment on the content item may be worth 0.02, an forwarding or sharing of the content item 122 may be worth 0.03, and so forth. A baseline probably of each of those interactions occurring may be multiplied by the value of each of those interactions and then summed to obtain the engagement value of the content item 122. Thus, if a content item has a ten percent change each of a link being clicked, a comment made, and of being shared, then, for those interactions, the engagement value would be 0.01*0.1+0.02*0.1+0.03*0.1=0.006, though it is noted that those interactions are not exhaustive. Furthermore, the interactions may be valued differently for different implementations.

In an example, the inherent value represented by the engagement value may vary, at least in part, based on either the user from whom the content item 122 was received or to whom the content item is to be displayed. Thus, certain content items 122 may have a higher engagement for certain types of users than other types of users. The federator module 108 may adjust the engagement value for a content item 122 based on user profile data 116 and activities 118 for the user to whom the content item is displayed. Thus, for instance, the engagement value for a content item 122 received from a CEO may be doubled relative to the engagement value for a content item 122 received from a non-managerial employee of the same company.

If the user interface metrics module 202 provided data for the particular content item 122 then the engagement value may be based only on the data related to that content item 122. If the user interface metrics module 202 provided data for the content item source 124 then all of the content items 122 from that source 124 may have an engagement value determined based on the same factors.

While the engagement value is not a monetary value, the engagement value may be scaled or otherwise computed to allow equivalence between the engagement value and the monetary value of the content item 122. The engagement value may be adjusted based on the selection metric and value metric of the content item 122 to account for the overestimation or underestimation of the likely interaction or value of the content item 122 by the selection and value schemas of the content item source 124. Thus, for instance, in the above example, the federator module 108 may determine that the value of a content item 122 from the sample first content item source 124 described above should be increased by $0.005 to account for the fact that the content items 122 from that source routinely underestimates the user interaction with the content items 122 by two (2) percentage points.

It is to be emphasized that the engagement and monetary values are, in fact, unit-less and may have any suitable numerical value. For the purposes of explanation in the disclosure herein, the values disclosed herein have been normalized to an equivalent monetary value, that is to say, even though the engagement value is not a monetary value, it is selected and scaled so that it is numerically equivalent or relevant to a currency value, e.g., United States dollars. Thus, in a simplified description for the purposes of illustration, the engagement value is in essence described as being calculated as an equivalent monetary value and combined with an actual monetary value to create the utility value of equivalent monetary value. However, it is to be noted and emphasized that the utility value does not need to represent an equivalent monetary value and rather can be directed at any "value" that administrators of the social network may have.

Thus, while the steps described herein may relate to bringing the engagement value into line with the monetary value, the opposite may readily be implemented to bring the monetary value in alignment with the engagement value according to the same principles. Thus, in a simplified example, one user interaction with a content item may have an engagement value of "1", and monetary values may, for instance, be multiplied by a factor of twenty (20); i.e., a monetary value of $0.005 is the equivalent to one interaction. It is to be readily understood that any suitable values value ranges may be implemented.

As such, the utility value may express a propensity for an associated content item to lead to any outcome that has value to the social network. In an example, the utility value may be tied to a number of "down-stream" interactions that may stem from an initial interaction with a content item. A down-stream interaction may stem from, for instance, a member selecting a link for a content item as the initial interaction, and any subsequent selections of links or comments and the like on the webpage that was linked to would be a down-stream interaction. The relative value of down-stream interactions may be identified based on social network policies in relation to the value of sponsored content items and implemented according to the principles described herein. Further examples of the actual policy or objective of the utility value, such as growth of the membership of the social network, may similarly be implemented according to these principles. As such, federator module 108 may be sensitive to the impact on those objectives that the changes to the initial rankings of the content item sources may cause and adjust the changes accordingly.

The user interfaces 204B, 204C of FIG. 4B depicts a push notification 404 of a content item 122 as provided by the federator module 108. As described above, the user interface 204A includes the feed 400, in which the federator module 108 transmits a command to individual content item sources 124 to provide content items 122 for display on the user interface 204A according to the mechanisms disclosed herein. Thus, the feed 400 is, in such examples, generated according to the command of the federator module 108.

By contrast, the user interfaces 204B, 204C include a push notification 404 of a single content item 122 provided by one content item source 124. The push notification 404 exists outside of the context of the feed 400, as illustrated as a "popup" window or screen in the user interfaces 204B, 204C. In various alternative examples the push notification 404 may be integrated into the user interfaces 204B 204C as a bar or window that may exist separate from but in the same screen as the feed 400.

The user interfaces 204B, 204C are user interfaces presented on different user devices. In an example, the user interface 204B is presented on a personal computer, such as a work station, a desktop computer, a laptop computer, or other computing device conventionally referred to as a personal computer or which is not otherwise considered to be readily usable as a "mobile device". The user interface 204C is presented on what is conventionally referred to as a mobile device, such as a smartphone, a tablet computer, a media player, a personal digital assistant ("PDA") and the like. It is to be recognized and understood that any of a variety of computing devices may be categorized according to the "personal computer" and "mobile device" classification as appropriate and that additional classifications may be implemented according to the principles disclosed herein.

As will be disclosed in detail herein, the federator module 108 may select, for one member associated with both user interfaces 204B, 204C, a content item 122 as provided by the content item sources 124 based, at least in part, on a suitability of the content item 122 for the particular user interface 204B, 204C and associated user device type on which the push notification 404 is to be displayed. While in various circumstances the user device type may not matter for which content item 122 is to be displayed as a push notification 404, in other circumstances the federator module 108 may select a first content item 122 for display to the member on the user interface 204B but a different, second content item 122 for display to the same member on the user interface 204C.

As will be disclosed in detail herein, individual content item sources 124 are configured to provide individual content items 122 to the federator module 108 without prompting from the federator module 108. Rather, the federator module 108 occasionally receives a content item 122 from a content item source 124 according to selection criteria of the content item source 124 itself and then decides, according to the criteria disclosed herein, whether or not to display the content item 122 as received as a push notification 404 on the user interface 204B.

In an example, the content item sources 124 generate content items 122 for the push notification 404 according to the same mechanisms provided for supplying multiple content items 122 for provision to the feed 400. Thus, some or all of the content item sources 124, according to their individual selection metrics, identify a content item 122 that may be of interest to a member associated with the user interface 204B or may be likely to result engagement by the member. The individual content item sources 124 then provide their individual content items 122 to the federator module 108 to generate a utility value according to the mechanisms disclosed herein, including adjustments for the quality of the individual content item source 124 from which an individual content item 122 was provided.

In various examples, the content item sources 124 provide their content item 122 for a push notification in conjunction with other content item sources 124, e.g., on a set schedule or based on a condition, such as the member logging in to the online social network system 100. Additionally or alternatively, the content item sources 124 may provide content items 122 according to asynchronous conditions, such as in the event that the content item source 124 identifies, in the course of other operations, a content item 122 that may be suitable for the member. Thus, the federator module 108 may receive multiple content items 122, one from each content item source 124, as potential push notifications 404 synchronously, such as simultaneously or essentially simultaneously, or may receive single content items 122 from single content item sources 124 asynchronously. In the first case, the federator module 108 may select one content item 122 from among the pushed content items 122. In either case, the federator module 108 may determine if any content item 122 is presented as a push notification 404 based on the determined utility value for the content item 122 in comparison with other utility values of the other content items 122 and/or a threshold utility value that may be met to display any content item 122 as a push notification 404 at all. These operations are discussed in detail in FIG. 6.

Figure 5:
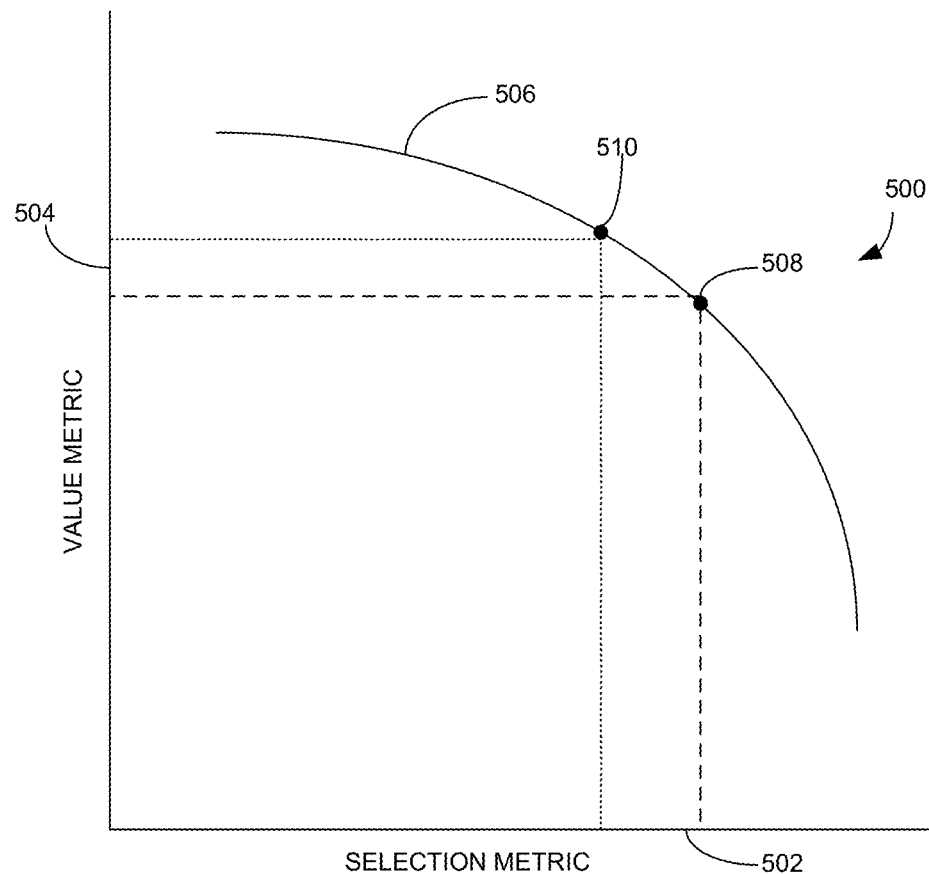
FIG. 5 is a graphic illustration of a relationship between the selection metric and the value metric, in an example embodiment.

FIG. 5 is a graphic illustration 500 of the relationship between the selection metric and the value metric, in an example embodiment. The x-axis 502 depicts the selection metric, such as the number of user interactions with a content item, while the y-axis 504 depicts the value metric, such as the value of the content item 122 if it were a piece of sponsored content. The curve 506 reflects how changes in the selection metric are reflected in the changes in the value metric and, as a consequence, the engagement value of the content item 122. According to this curve, increasing the selection metric by two (2) percentage points from a first point 508 to a second point 510 may produce the $0.005 engagement value referenced above.

The federator module 108 may then generate a utility value for each of the content items 122. The utility value reflects an engagement component and a monetary component. The engagement component is, in an example, comprised of the selection metric multiplied by the engagement value. The value component is, in an example, comprised of the value metric. The engagement component and the value component are, in an example, added together to obtain the utility value. The utility value may represent a normalized value for the content item 122. In various examples, the federator module obtains a utility value for each of the content items obtained from the content item sources 124.

In an example, the utility value will depend on a status of the content item 122 as organic content or sponsored content. The utility value of a sponsored content item may be the engagement component (e.g., the engagement value multiplied by the selection metric) added to the value metric. The value metric for the sponsored content item may be a bid that the sponsoring entity has paid or will pay for the sponsored content item multiplied by the selection metric. In an example, the value metric is thus computed by multiplying the estimated interaction rate for the sponsored content item by the amount of money the sponsoring entity promised to pay every time the sponsored content item is selected by a user. Thus, the utility value for a sponsored content item would be the sum of the expected monetary value of the sponsored content item and the engagement value of the sponsored content item. Put another way, the value of a sponsored content item may be realized in both the ability of the content item 122 to drive user engagement with the social network and the ability of the content item 122 to directly generate revenue.

The utility value of an organic or unsponsored content item, on the other hand, would, in the above example, be based entirely on the ability of the content item 122 to generate engagement with the social network. Thus, the utility value for the organic content item would be only the engagement component (the engagement value multiplied by the selection metric). Thus, it may be discerned that a piece of organic content that drives a great deal of user engagement may have a higher utility value than a piece of sponsored content that that drives relatively little user engagement. Further, a piece of sponsored content that has the same or similar user engagement as an organic content item would have the higher utility value because of the monetary component; all other things being equal, the utility value for a content item 122 that is sponsored would be higher than the utility value of a sponsored content item 122 that is organic.

The federator module 108 may thus, in essence, establish a normalized, monetary value for each of the content items 122 it receives for display on the feed 400 of the user interface 204. In so doing, the federator module 108 may both consistently establish the relative value of the content items 122 it receives, regardless of the first-pass ranker schemas utilized by the content item sources 124, and provide a framework by which the value of a sponsored content item may be compared against an organic content item and vice versa. Thus, both the value of the organic content items may be quantified and organic content items may be accurately positioned relative to sponsored content items on the feed 400.

In particular, the federator module 108 may include, as part of the stream 200, the relative utility values of the content items 122 to the user interface module 102. Alternatively, the federator module 108 may simply order the content items 122 within the stream 200 according to their respective utility values. The user interface module 102 may then cause the content items 122 to be sequentially placed in the positions 402, at least in part according to their utility values. Thus, in an example, the highest utility value may be positioned in the first position 402(1), the second highest utility value in the second position 402(2), and so forth. Alternatively, additional factors may be implemented in order to meet certain conditions.

The conditions may, in various cases, specify displaying sufficient sponsored content items to generate a maximal amount of revenue while maintaining user engagement, in the form of interactions with the content items above a predetermined threshold. Thus, the sum of the engagement components of some or all of the content items 122 that may be displayed over a period of time may be plotted against the sum of the value components of the content items 122 that may be displayed over a period of time. In selecting the content items 122 for the stream, the federator module 108 may select content items with sufficiently high engagement components to maintain the desired user engagement and then, among that population, select the content items 122 with the highest value component.

The above example is simplified and it is to be understood that multi-objective optimization techniques may be applied to the population of content items 122 as appropriate. The constraints of the multi-objective optimization may be applied separately to different types of users depending on the activities 118 conducted by the individual users. Thus, certain users may be relatively more likely to select sponsored content items than other users. Those users may be presented with more sponsored content items than other users, thereby potentially increasing both the value metric, as sponsored content may be directed to the users most likely to select the sponsored content and thus provide the revenue, as well as engagement, as more scope may thus be had to display content items 122 with relatively high engagement components.

The principles applied to direct knowledge of the propensity of users to select sponsored content may be applied based on general user characteristics. Thus, it may be determined that males of a certain age, education, and career may be relatively more likely to select sponsored content than women of the same age, education, and career. Those relationships may be determined empirically, such as by being objectively determined in the testing mode. The difference in the likelihood of a certain demographic of user to select or not select sponsored content may produce a proportional increase in the rate at which sponsored content is displayed. Thus, if a certain demographic of user is twenty-five percent more likely to select a sponsored content item than the average user then users of that demographic may be presented with twenty-five percent more sponsored content. Alternatively, the additional sponsored content a user is presented with may be selected as a multi-objective optimization variable, such as to maximize revenue while maintaining user engagement, and may not necessarily be tied to any particular percentage.

The federator module 108 may be configured to retain sponsored content items in a particular order prior to or while including the sponsored content items in the stream 200. In various examples, sponsored content items 200 may be ranked with respect to one another prior to determining and applying the engagement value to the sponsored content items. After obtaining the engagement value, the sponsored content items may be re-ranked with respect to the organic content items. However, in certain examples, the sponsored content items may not be re-ranked with respect to one another. Doing so may maintain the relative position of the sponsored content items for regulatory purposes. The fixing of the position of certain content items 122 with respect to one another may be configurable based on any regulatory requirements in any relevant jurisdictions. The fixing of the position of certain content items 122 may also be based on business needs or any other suitable factors.

The principles described herein with regard to the federation of individual content items 122 apply as well to the federation of aggregated content items. An aggregated content item may be a combination of individual content items 122 combined or otherwise placed together so that they may be displayed in a single position 402, in contrast with conventional, individual content items 122 which are displayed one per position 402. The aggregated content item may be made up of individual content items 122 that are related to one another in some way, such as by being related to common news or members of the social network who share a common personal characteristic 116, such as a job, a job status, a school, and so forth.

Individual content items 122 as displayed on the feed 400 may not generate much user interaction by themselves but may generate more interest when presented as an aggregated content item. For instance, the news that a first member has changed jobs to Company X may not generate much interest by itself. However, an aggregated content item that seven members have all changed jobs to Company X in the last three days may generate much more user interaction than seven separately-listed content items 122.

An aggregated content item 122A is illustrated in the user interface 204 in FIG. 4. In contrast to conventional content items 122, the aggregated content item references more than one discrete event, occurrence, or member. Thus, the aggregated content item 122A states that members X, Y, and Z all joined Company A in the last two days. A conventional, non-aggregated content item 122 might merely state that member X joined Company A yesterday, by way of illustration.

The federator module 108 may be configured to rank the aggregated content item 122A consistent with the ranking of other content items 122 described herein. That is to say, the federator module 108 may determine a utility value for the aggregated content item 122A based on an engagement value of the aggregated content item 122A and, if the aggregated content item 122A is a sponsored aggregated content item 122A or includes at least some sponsored content, a monetary value as well.

In an example, a distribution of utility values of the constituent content items 122 of the aggregated content item 122A may be utilized to determine the utility value of the aggregated content item 122A. The distribution of utility values of the constituent content items 122 may also be utilized by the federator module 108 to determine if individual content items 122 should be removed from the aggregated content item 122A in order to improve the overall utility value of the content items 122 included in the aggregated content item 122A. While utility values will be discussed herein, it is to be recognized and understood that any of a variety of metrics may be utilized for decision regarding the aggregation of content items. For instance, basic estimated selection metrics, such as estimated interactions or click-through-rates, may be utilized in addition to or instead of the utility value.

To determine the utility value of an aggregated content item 122A or, in various examples, a proposed aggregated content item 122A, the federator module 108 utilize multiple models based on various factors. The models may be empirically determined based on arbitrarily generating aggregated content items 122A in the testing mode described herein and randomly presenting those aggregated content items 122A on user interfaces 204. In various examples, individual models are based on a distribution of utility values of the constituent content items 122, a time since or over which the content items 122 were obtained or generated, and an overall number of content items 122 in the feed 400.

The distribution model may be based on an average of utility values of individual content items 122, a maximum one of the utility values of the individual content items 122, a minimum one of the utility values of the individual content items 122, and a standard deviation of the utility values of the individual content items 122, among other potential factors. The interplay of those factors may be determined empirically. In an example, the distribution model may determine the utility value of the aggregated content item 122 by computing the average utility value of the constituent content items 122 and adjusting for the standard deviation of the utility values of the content items 122.

Thus, for instance, it may have been empirically determined that the distribution model tends to produce an accurate utility value for the aggregated content item 122A based on the average of the utility values of the individual content items 122A adjusted upward for a relatively small standard deviation and adjusted downward for a relatively large standard deviation. For instance, a standard deviation less than twenty-five percent of the average may be "small" and provide a bonus while a standard deviation greater than or equal to twenty-five percent may be "large" and provide a penalty. The bonuses and penalties may be proportional to size of the standard deviation. By way of illustration, if the average utility value is 0.005 and the standard deviation is 0.001 then the utility value of the aggregated content item may be 0.005+ 10*(0.00125−0.001)=0.0075, where the "0.005" value is the average utility value of the content items 122, the "0.00125"

value is twenty-five percent of the average, the "0.001" value is the standard deviation, and the "10" value is an empirically-determined bonus multiplier. The distribution model, then, would provide a utility value for the aggregated content item 122A of 0.0075.

The time and amount of content items 122 models may function in the same or similar ways. The time model may assign bonus utility values to content items 122 based on a time since the content item 122 in question was generated. The utility values may be assigned based on an empirically-determined decay model. For example, a content item 122 that is less than one day old may have a bonus utility value of 0.001, more than one but less than two days old may be 0.0005, more than two but less than three days may be 0.0025, and so forth. The utility values for the time model may then be combined utilizing some or all of the factors for the distribution model, e.g., average, minimum, maximum, and standard deviation.

Relatedly, the overall number of content items 122 in the feed 400 may tend to factor the utility values of individual content items 122 over the utility value of the aggregated content item 122A so as to provide more or fewer content items 122 for the feed 400. Thus, if the federator module 108 has relatively few content items 122 for the feed 400 then the individual content items 122 of the aggregated content item 122A may be given a relatively high bonus utility value while the aggregated content item 122A as a whole may be given a relatively low bonus utility value. By so doing, the content items 122 of the aggregated content item 122A may be more likely to be broken out of the aggregated content item 122A and presented individually on the feed 400. Conversely, if the federator module 108 has a relatively large number of available content items 122 then the federator module 108 may subtract utility value from the content items 122 of the aggregated content item 122A, making the content items 122 more likely to remain part of the aggregated content item 122A.

The individual models may all be individually implemented and then manipulated together or otherwise compared. In an example, the individual models may be averaged or may be added together to obtain a final utility value for the aggregated content item 122A. Alternatively, only one determined utility value may be utilized, for instance by selecting a maximum value, minimum value, or middle value among the utility values provided by the various models. Further alternatively, individual models may be separately assessed in the testing mode and given bonus or negative weight or otherwise favored or disfavored based on the performance in the testing mode. Thus, a model that consistently accurately provides a utility value may be weighted higher than a model that inconsistently provides accurate utility values. Alternatively, only the best single model may be utilized, though other models may be used, particularly in testing mode, to seek to improve the results of the models and utilize the models at a later date.

Based on the final utility value for the aggregated content item 122A, the federator module 108 may display the aggregated content item 122A in an appropriate position 402 depending on the utility values of other content items 122, not display the aggregated content item 122A at all, and/or separate individual content items 122 out of the aggregated content item 122A if those individual content items 122 have utility values greater than the utility value of the aggregated content item 122A. In an example, if the aggregated content item has a utility value of 0.003 but one content item 122 of the aggregated content item 122A has a utility value of 0.004 and another has a utility value of 0.005 then those content items 122 may be removed from the aggregated content item 122A. In various examples, the aggregated content item 122A may be recomputed to determine its new utility value or may be inserted into the stream 200 in a position appropriate to its utility value.

The utility values of content items 122 (including herein both individual content items 122 and aggregated content items 122A) may be based on a relevance of the content item 122 to the profile data 116 and activities 118 of the member to whom the content items 122 are to be or may be presented. In various examples, profile data 116 and activities 118 may be utilized by the federator module 108 along with other factors to adjust the utility value of content items 122. The federator module 108 may thus provide content items 122 according to their value to the member to whom the content items 122 are presented rather than to a generic or generalized member.

In an example, a member may have an identifiable affinity for certain item-types, i.e., the member may prefer certain types of content items 122 over others. Similarly, the member may dislike certain types of content items 122. The affinity for content item 122 types may be based both on inferences from the profile data 116 of the member and past history as evidenced by the member's activities 118.

While the principles related to affinity are described with respect to utility values, it is to be recognized and understood that they may apply equally well to circumstances that provide content items 122 outside of the utility value framework. Thus, bonuses to simple relevance factors or other metrics by which content items 122 may be selected for display to users of a social network may also be applied consistent with this disclosure.

In an example, a member who has profile data indicating that they are a computer programmer may tend to have an affinity for articles and links related to computer programming, computers generally, engineering generally, and so forth. In an example, the utility value of such types of content items 122 may be given a bonus for each profile data item 116 that correlates with the content item 122 type. Similarly, computer programmers may tend to be neutral towards other types of content items 122 and may affirmatively dislike other types of content items 122.

The federator module 108 may identify such correlations across multiple members. Thus, the federator module 108 may identify that computer programmers generally are fifty percent more likely to interact with content items related to computer programming than the population of members of the social network generally. In such an example, the utility value of computer programming content items 122 may be given a fifty percent bonus. Alternatively, the bonus may be of a different percentage or may be a fixed value for matching a type with which the member has an affinity, e.g., a bonus of 0.001 to the utility value. Any of a variety of suitable bonuses may be applied, and such bonuses may also be negative for members who tend to dislike a content item 122 type.

The principles for profile data 116 apply as well to activities 118 for a particular member. Thus, if a member's activities 118 indicate that the member tends to interact with computer science content items 122 forty percent more frequently than members of the social network in general, the utility value of computer science content items 122 may receive a bonus. The bonus may be according to any suitable mechanism, including the mechanisms described above.

The bonuses may be cumulative across multiple profile data 116 and activities 118 for a single content item 122 or may be based on a single most significant factor. The single most significant factor may be a member's own activities 118, with profile data 116 being utilized if in the event the activities 118 are unavailable or not extensive enough to establish a preference. Thus, if a member's profile data 116 indicates that the member would be expected to have an affinity for a content item 122 type but the member's activities 118 indicate that the member dislikes the content item 122 type then the utility value of the content item 122 may be reduced rather than increased.

The principles described with the item-type affinity may be applied to other concepts as well. In an example, members may have an affinity for the source of a content item 122 rather than the content of the content item 122 itself. Thus, members may tend to click on links in a content item 122 or otherwise interact with a content item 122 if the content item 122 is provided by a particular source. Such sources may include individuals, companies, groups, and the like. Such sources may include the social network system 100 itself, such as for automatically-generated content items 122.

Source affinity may be unique to each member. Thus, source affinity may be based on activities 118 for the particular member and may not necessarily be based on profile data 116 of the member. Alternatively, certain profile data 116 may be indicative of a propensity for source affinity. Thus, computer programmers may have a source affinity for certain celebrities in computer programming that may be factored in the same manner described above with respect to profile data 116 and item-type affinity.

Network-size affinity may also be utilized to provide a utility value bonus. The social graph data 112 for a member who posts a content item 122 to the social network may be compared against the social graph data 112 of a member to whom the content item 122 may be presented. If the number of connections in the social graph data 112 of the two members is broadly similar then the content item 122 may receive a bonus to the utility value for display on the feed 400 of the potential receiving member. In an example, two social graphs 112 have a similar number of connections if the number of connections are within twenty-five percent of one another. Alternative percentages or absolute numbers of connections may be utilized as appropriate.

The bonus may be increased the closer in numbers the two social graphs 112 are. Thus, the bonus may be 0.005 if the social graphs 112 are within twenty-five percent, 0.003 if the social graphs are between seventy-five and twenty-five percent, and 0.001 if the social graphs are between seventy-five and one hundred percent of one another. The bonus may be negative if the social graphs 112 are larger than a certain percentage. In an example, if the social graphs 112 are more than two hundred percent of one another then the penalty may be 0.001, and so forth. It is to be recognized that the percentages may be from comparing the largest number of connections with the smallest number of connections for the purposes of this illustration. Thus, if the connections were one hundred twenty-five and one hundred then the percentage would be twenty-five percent. If the connections were two hundred and one hundred then the percentage would be one hundred percent. If the connections were three hundred and one hundred then the percentage would be two hundred percent, and so forth.

Affinities may be combined with one another to produce relatively more complex affinities. Thus, in an example, the content item type affinity may be combined with the network-size affinity or network size generally. Utility values between various affinity metrics may be added, multiplied, or otherwise combined together to provide a broader affinity bonus. The federator module 108 may empirically determine, for instance in the testing mode, and further correlation between individual affinities and adjust combined bonuses accordingly. As such, the combination of content item type affinity and network size may produce a different bonus depending on how those affinities relate in actual practice.

The federator module 108 may utilize various techniques to provide content items 122 in the feed 400 in a manner that is financially efficient for the social network as well as useful to and visually pleasing for the member to whom it is presented. In particular, the federator module 108 may provide for blending of content items 122 so that particular types of content items 122 do not clump or otherwise dominate the feed 400, notwithstanding the absolute utility values of those content items 122. Further, the federator module 108 may provide for diversity of content item 122 type on the feed 400.

Blending of content items 122 may utilize the data from the content item 122 type analysis above to prevent undue clumping of content items 122 of the same type from occurring. In various examples, content item types may include sponsored or organic content, content items provided by the same source, content items related to the same topic, content items providing the same type of information (such as members who change jobs or notices that an entity is "trending", and so forth), and so forth.

The federator module 108 may utilize the testing mode to identify degrees of blending, or lack thereof, that promote user interaction with content items 122 in the feed 400. The federator module 108 may empirically determine degrees of blending according to the same content item types in adjacent positions 402, a number of the same content item type in consecutive positions 402, a percentage of the same content item type in consecutive positions 402 (e.g., three content items 122 of the same type in five consecutive positions 402), and so forth. The federator module 108 may utilize the testing mode to display content items 122 according to their utility values but without respect to blending concepts and then iteratively apply different blending concepts to empirically determine blending concepts that provide for optimized user interaction with content items 122, optimized utility value, and any of a variety of other metrics.

In an example, the federator module 108 may operate in the testing mode to determine blending concepts by testing concepts of varying stringency. Thus, a blending concept may mandate no content items 122 of the same type in adjacent positions 402. A less stringent blending concept may mandate that two content items 122 of the same type may be in adjacent positions 402 but not three, and so forth. Blending concepts may also be sensitive to certain types of content items 122 but intentionally not other types. Thus, in an example, the blending concepts may be sensitive or more sensitive to certain content item 122 types and not others. By way of illustration, a first blending concept may require that sponsored content items 122 not be placed in adjacent positions 402 while a second blending concept, implemented concurrently with the first blending concept, may require that not more than three content items 122 provided from the same source be placed in five consecutive positions 402, and so forth.

It is to be recognized that certain blending concepts may be produce results that are inconsistent or conflict with one another, such as where one concept suggests a placement of a content item 122 in a position 402 but another concept determines that the content item 122 cannot be placed in that position 402. In cases such as those, the federator module 108 may establish a hierarchy for resolving conflicts. In such a hierarchy, one blending concept may control conflicts. In the above example, the sponsored content blending concept may override the source blending concept. The hierarchy, along with the parameters of the blending concepts, may also be set as a matter of social network policy and may not necessarily be adjusted by the federator module.

The federator module 108 may provide for diversity in the feed 400 by adjusting utility values or associated positions 402 of content items 122 that are related to content items 122 that have already been seen by a user on the feed 400 or will already have been seen by the user on the feed 400. Thus, in various examples, a content item 122 of a content item type with a highest utility value may be placed in a high position 402. The federator module 108 may, depending on the diversity criteria, adjusting the utility values or positions of lower utility value content items 122 of the content item type to prevent the other content items 122 of the type from being in positions 402 that are too close to the position 402 of the highest-value content item 122.

In an example, four content items 122 of a single content item type have utility values that would cause those content items 122 to be placed in positions 402 on the feed 400. The federator module 108 may then apply a discount to the three content items 122 having the lowest utility values. In an example, each of the lowest-value three content items 122 would have their utility value multiplied by a predetermined factor, such as 0.75, and reassessed for new positions 402 in the feed 400. It is noted that the reassessment of the three content items 122 may result in other content items 122 of the type being repositioned accordingly. Thus, if the second-highest-value content item 122 of the type drops three positions 402 because of the diversity discount, then the content items 122 in those three positions 402 would each be moved up by one position 402.

Upon the application of the discount to the three content items 122, the federator module 108 may reassess if the diversity requirements have been met. If not, the discount may be iteratively applied again to each of the content items 122 of the type that still violate diversity requirements; in such an example, those content items 122 that have the discount applied twice would have a discount of $0.75^2=0.5625$. The discount may be iteratively applied to individual ones of the content items 122 of the type until the content items 122 of the type meet the diversity requirement.

The federator module 108 may rank the content items 122 it assesses according to their utility values and then apply diversity requirements to all of the content items 122 that have been ranked or to a predetermined number of the highest ranked content items 122. Diversity requirements may be applied concurrently among all of the content items 122 that are ranked or to the predetermined number of the highest ranked content items 122. As the diversity requirements are applied to the ranked content items 122, the discounts may be applied to the ranked content items 122 as appropriate. Thus, content items 122 that violate any of the diversity requirements may have the discount applied to their utility values.

Following the application of the discount to the utility values of the ranked content items 122, the federator module 108 may re-rank the content items 122 and reassess the content items 122 for the diversity requirements. Content items 122 that, as re-ranked, violate the diversity requirements may have the discount applied again and may be re-ranked. The assessment of diversity requirements, the application of a discount to the utility values of content items 122 that violate the diversity requirements, and the re-ranking of content items 122 may be conducted iteratively until all of the diversity requirements are met, the content items 122 as ranked settle into a steady state, or a "time-out" condition is met following a predetermined number of iterations.

The content item 122 types may be based on a variety of factors and each content item 122 may have multiple item types. In an example, content items 122 may be classified according to an actor of the content item 122, such as a user who posted an article or a user about whom the content item refers. e.g., "John Doe started a new job at Company X." In an example, content items 122 may be classified according to a verb or action of the content item 122; thus, in the above example, a content item may have as a verb or action "started a new job". In an example, content items 122 may be classified according to an object of the content item 122; thus, in the above example, the object would be "Company X".

The diversity requirement may be general in the feed 400 or may be local in the feed 400. In an example, a local diversity requirement may require diversity among the positions 402 that are displayed on the feed 400 at any one time but not for positions 402 that are not or cannot be displayed concurrent with the positions 402 that are currently displayed. Thus, in an example, if the feed 400 as a whole only displays five positions 402 at a time then the diversity requirement may only be applied to the content items 122 that would be displayed in those five positions 402 based on the initial utility value ranking.

The federator module 108 may utilize the testing mode to optimize diversity requirements. The optimization may be generally applied across the members and users of the social network or may be individually applied to members based on those member's responses to various diversity requirement implementations. Thus, the federator module 108 may randomly vary diversity requirements and, for instance, allow four content items 122 of the same type within an eight-position 402 block when the base diversity requirement is for only three content items 122 of the same type and assess the reaction of users to the relatively less-diverse requirement. If the less-diverse requirement produces greater user interaction with content items in the feed 400 then the less-diverse requirement may be implemented as the default diversity requirement. It is to be recognized that these principles may be applied to individual members of the social network for personalized diversity requirements.

Flowchart

Figure 6:
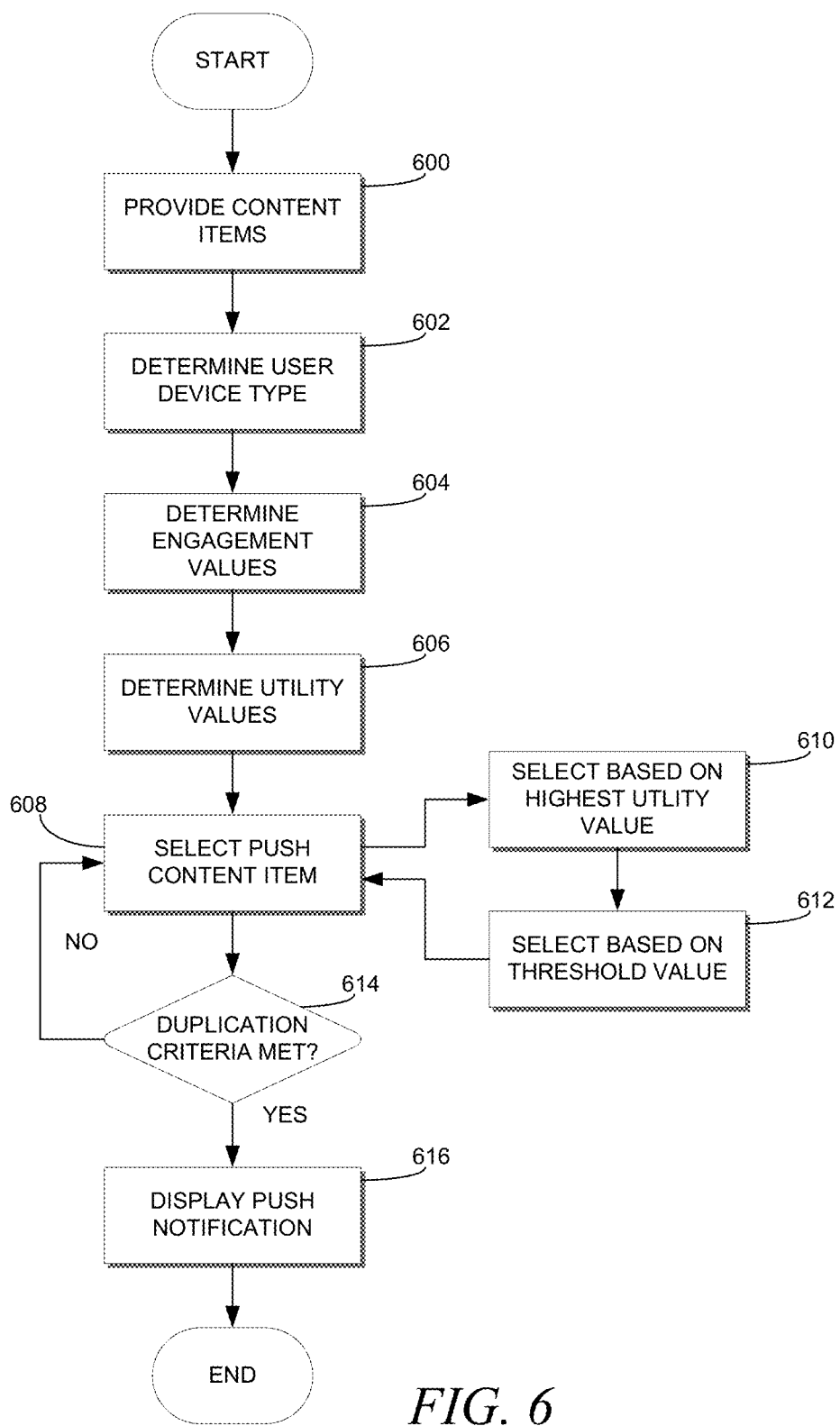
FIG. 6 is a flowchart for social network content item federation based on item utility value, in an example embodiment.

FIG. 6 is a flowchart for push notifications based on item utility value, in an example embodiment. The flowchart may be implemented according to any of a variety of example systems and methods disclosed herein or as may be suitable for implementing the flowchart.

At operation 600, first and second content items 122 are provided from first and second content item sources 124 to the federator module 108. As disclosed herein, the provision of the first and second content items 122 may be synchronous, e.g., based on a common criterion, such as a time or an event (e.g., the member logging in to the online social network), or asynchronous, e.g., a content item source 124 determining without respect to an external condition such as time or an event that a content item 122 may be presented as a push notification 404. In any event, over time the first and second content item sources 124 each provide one content item 122 to the federator module 108 for consideration as push notifications, whether synchronously or asynchronously.

In various examples, each content item source 124 provides at most one and only one content item 122 for consideration by the federator module 108 for provision as a push notification 404. Certain content item sources 124 may provide no content items 122. However, it is to be understood that the principles described herein may also be applied to alternative examples in which a single content item source 124 may provide more than one content item 122 for concurrent consideration as a push notification.

At operation 602, the federator module 108 determines from the user interface module 102 a device type of the user device to which a push notification 404 may be transmitted and, as a consequence, whether the push notification 404 is to be presented on the user interface 402B or the user interface 402C. In various examples, the federator module 108 differentiates between personal computer device types and mobile device types, as disclosed herein.

At operation 604, the federator module 108 determines a first engagement value for the first content item 122 and a second engagement value for the second content item 122 by the federator module 108. The first and second engagement values are determined according to any or all of the mechanisms disclosed herein. The first and second engagement values may be determined specific to the user interface 402B, 402C on which the first and second content items 122 may be determined. Thus, the activity data 118 may further be considered on the basis of the user device type on which the associated content items 122 have been displayed. In a simplified illustrative example, if the first content item 122 has a ten (10) percent higher rate of user engagement when displayed on the user interface 402B than on the user interface 402C, the first engagement value may be adjusted accordingly depending on whether the push notification is to be sent to the user interface 402B or 402C, as determined at operation 602.

At operation 606, the federator module 108 determines first and second utility values for the first and second content items 122, respectively, based on the first and second engagement values, respectively, and selection metrics of the first and second content item sources 124, respectively, all as disclosed in detail herein. To the extent that one of the content items 122 is a sponsored content item a value metric, such as a monetary bid or an amount of money that would be realized based on a provision of or engagement by the member with the sponsored content item 122 is also included in the utility value, again as disclosed in detail herein.

At operation 608, the federator module 108 selects one of the first content item 122 and the second content item 122 as a push content item for display as the push notification 404. In various examples, the federator module 108 selects one and only one content item 122 for display as a push notification 404 at any given time. However, in various alternative examples, the principles disclosed herein may be adapted to configure the federator module 108 to select multiple content items 122 for display as push notifications simultaneously (e.g., as multiple push notifications in a single window) or over a short period of time (e.g., a second push notification 404 is displayed immediately after a first push notification 404 is closed or dismissed).

The federator module 108 may utilize any of a variety of criteria for selecting the one of the first and second content items 122 as the push content item. At operation 610, the federator module 108 selects the push content item by identifying the highest or most valuable utility value of the first and second utility values and selecting the corresponding one of the first and second content items 122. At operation 612, the federator module 108 selects the push content item by determining if the first or second utility values qualifies relative to a threshold value. In various examples, if a content item 122 does not have a utility value that meets or exceeds the threshold value then the content item 122 is not eligible as a push notification 404.

In various examples, both of the operations 610 and 612 are implemented. Thus, in such an example, if both of the first and second utility values meets or exceeds the threshold value then the content item 122 corresponding to the highest utility value is selected as the push content item. If only one of the utility values meets or exceeds the threshold then the corresponding content item 122 is selected as the push content item, and if none of the utility values meets or exceeds the threshold value then no content items 122 are selected as push content items. By way of illustration, if the first utility value is 0.1, the second utility value is 0.08, and the threshold value is 0.1 then the first content item 122 is selected as the push content item 122 by virtue of the corresponding utility value being the only one to meet the threshold value as well as by virtue of the corresponding utility value exceeding the second utility value. In the event of a tie between utility values the federator module 108 may variously implement any suitable tie-breaking mechanism or select both corresponding content items as push content items.

At operation 614, the federator module 108 determines if the push content item as selected at operation 608 meets one or more duplication criteria. In various examples, a duplication criterion is that the push content item can never have been displayed as a push notification to the member before. Alternatively, the duplication criterion is that the push content item has not been displayed as a push notification to the member since a predetermined time, e.g., two weeks, one month, or any of a variety of predetermined times that may be selected based on the priories of system administrators.

Further, a duplication criterion may be based on a content item type of the push content item. Thus, if the member has received a push notification of a content item of the same type as the push content item over a predetermined period of time, the duplication criterion may be violated. The content item type may be based on any of the content item types disclosed herein or any other content item type that may desirably be implemented to prevent undesired duplication over predetermined time periods. Thus, content item types may be based, for instance, on the subject of or actor in a news story, with the duplication criteria being that another news item having the same object or actor not be provided as a push notification over a predetermined period of time different than that of news stories in general. These principles may be applied to any general content item type; thus, job notices form a particular employer may have a longer predetermined time than job notices in general.

As such, different content item types may have different predetermined times over which they apply, dependent on the policies of the social networking system administrators. Thus, for instance, the predetermined time period may be several days or one week for job recommendation content items, but the predetermined time period for status updates of individual members may be multiple weeks or more. The predetermined time may be adjusted over time for individual members based on their engagement with content items as provided as push notifications and as stored as activities 118. Thus, if a member's engagement with a content item type does not deteriorate in spite of comparatively frequent push notifications of that content item type then the predetermined time may be reduced. Similarly, if engagement with the content item type does decrease then the predetermined time may be lengthened.

Multiple duplication criteria may be applied simultaneously as appropriate. Thus, a duplication criterion may be applied for a news story, another duplication criterion may be applied for a subject of the content item, and so forth. In an example if any one duplication criterion is violated then the push content item may fail the duplication criteria. Alternatively, other pass/fail criteria may be applied. For instance, if a push content item passes two criteria by fails one criterion then the push content item may be deemed to pass overall.

If the push content item passes the one or more duplication criteria then the federator module 108 proceeds to operation 616. If the push content item fails duplication then the federator module 108 removes the content item that was identified as the push content item and returns to 608 to either identify a new push content item and proceed according to the flowchart or no select a push content item at all.

At operation 616, the user interface module 102 causes the push content item to be displayed as a push notification 404 on the user interface 204 of the user device associated with the member. As disclosed herein, the user interface module 102 formats the push notification 404 as appropriate for display on the user interface 204.

System

Figure 7:
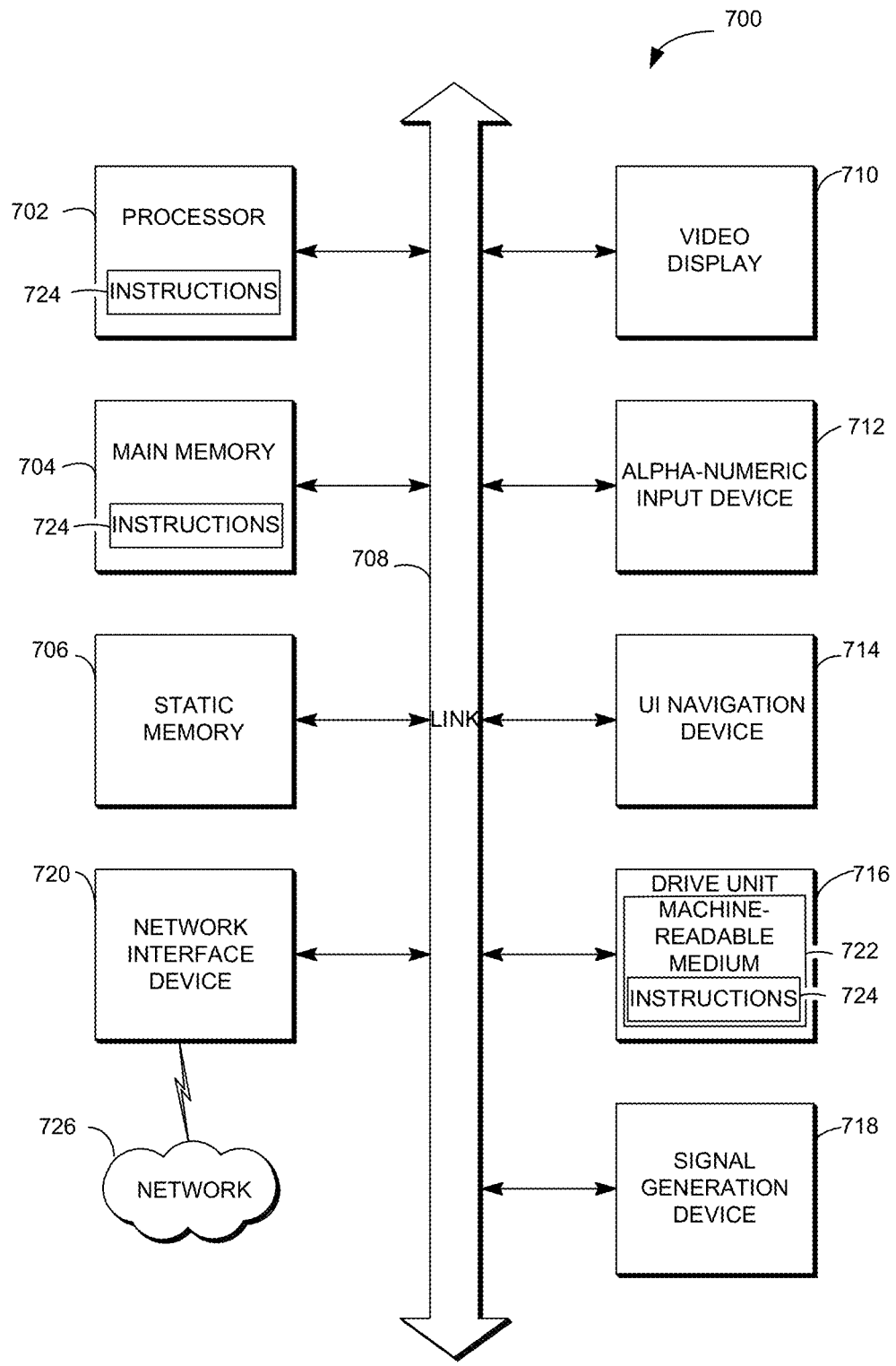
FIG. 7 is a block diagram illustrating components of a machine, according to some example embodiments.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, the machine 700 may implement the social network system 100 and the features included and described therein. The machine 700 thus describes specific hardware configurations on which the social network system 100 may be implemented and provided to users of the social network system 100.

FIG. 7 shows a diagrammatic representation of the machine 700 in the example form of a computer system and within which instructions 724 (e.g., software) for causing the machine 700 to perform any one or more of the methodologies discussed herein. In alternative embodiments, the machine 700 operates as a standalone device or may be connected (e.g., networked) to other machines. In a networked deployment, the machine 700 may operate in the capacity of a server machine or a client machine in a server-client network environment, or as a peer machine in a peer-to-peer (or distributed) network environment. The machine 700 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The machine 700 may further include a graphics display 710 (e.g., a plasma display panel (PDP), a light emitting diode (LED) display, a liquid crystal display (LCD), a projector, or a cathode ray tube (CRT)). The machine 700 may also include an alphanumeric input device 712 (e.g., a keyboard), a cursor control device 714 (e.g., a mouse, a touchpad, a trackball, a joystick, a motion sensor, or other pointing instrument), a storage unit 716, a signal generation device 718 (e.g., a speaker), and a network interface device 720.

The storage unit 716 includes a machine-readable medium 722 on which is stored the instructions 724 (e.g., software) embodying any one or more of the methodologies or functions described herein. The instructions 724 may also reside, completely or at least partially, within the main memory 704, within the processor 702 (e.g., within the processor's cache memory), or both, during execution thereof by the machine 700. Accordingly, the main memory 704 and the processor 702 may be considered as machine-readable media. The instructions 724 may be transmitted or received over a network 726 via the network interface device 720.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 700), such that the instructions, when executed by one or more processors of the machine (e.g., processor 702), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method, comprising:

determining, with a processor executing a user interface metrics module of an online social network system, first and second engagement values for first and second content items, respectively, provided by first and second content item sources, respectively, based on activity data of previous interactions by a member of the online social network with content items from the first and second content item sources of the online social network system, the activity data having been stored in an electronic data storage of the online social network system;

the first content item provided based on a first selection metric in relation to the activity data and a value metric;

the second content item being different than the first content item and provided based on a second selection metric in relation to the activity data;

generating, with the processor executing a federator module, first and second utility values for the first and second content items, respectively, based on a mathematical operation applied to the first and second engagement values, respectively, the first and second selection metrics, respectively, and, for the first utility value, the value metric;

determining, with the processor, one of the first and second content items as a push content item based on a difference between the first and second utility values; and causing, with the processor, via a network interface, a user device associated with the member to display the push content item as a push notification.

2. The method of claim 1, further comprising:

determining, with the processor, a user device type of the user device as being one of a plurality of predetermined device types; and determining, with the processor, the push content item based, at least in t, on the laser device being the one of the plurality of predetermined device types.

3. The method of claim 2, wherein the predetermined device types are a personal computer device type and a mobile device type.

4. The method of claim 1, further comprising determining, with the processor, a duplication criterion of the push content item, wherein causing a user interface of the user device to display the push content item is based on the duplication criterion having been met.

5. The method of claim 4, further comprising selecting a new push content item based on the duplication criterion not having been met.

6. The method of claim 1, wherein the selection metric is a rate at which users are expected to select a corresponding content item.

7. The method of claim 1, wherein the value metric is an estimated monetary value when the content item is viewed on the user device.

8. A non-transitory computer readable medium comprising instructions which, when performed on a processor of an online social network system, cause the processor to execute a user interface metrics module and a federator module to perform operations comprising:

determining first and second engagement values for first and second content items, respectively, provided by first and second content item sources, respectively, based on activity data of previous interactions by a member of the online social network system with content items from the first and second content item sources of the online social network system, the activity data having been stored in an electronic data storage of the online social network system;

the first content item provided based on a first selection metric in relation to the activity data and a value metric;

the second content item being different than the first content item and provided based on a second selection metric in relation to the activity data;

generating first and second utility values for the first and second content items, respectively, based on a mathematical operation applied to the first and second engagement values, respectively, the first and second selection metrics, respectively, and, for the first utility value, the value metric;

determining one of the first and second content items as a push content item based on a difference between the first and second utility values; and causing via a network interface, a user device associated with the member to display the push content item as a push notification.

9. The computer readable medium of claim 8, further comprising:

determining, with the processor, a user device type of the user device as being one of a plurality of predetermined device types; and determining, with the processor, the push content item based, at least in part, on the user device being the one of the plurality of predetermined device types.

10. The computer readable medium of claim 9, wherein the predetermined device types are a personal computer device type and a mobile device type.

11. The computer readable medium of claim 8, further comprising determining, with the processor, a duplication criterion of the push content item, wherein causing a user interface of the user device to display the push content item is based on the duplication criterion having been met.

12. The computer readable medium of claim 11, further comprising selecting a new push content item based on the duplication criterion not having been met.

13. The computer readable medium of claim 8, wherein the selection metric is a rate at which users are expected to select a corresponding content item.

14. A system, comprising:

a non-transitory computer readable medium comprising instructions which, when performed on a processor of an online social network system, cause the processor to execute a user interface metrics module and a federator module to perform operations comprising:

determining first and second engagement values for first and second content items, respectively, provided by first and second content item sources, respectively, based on activity data of previous interactions by a member of the online social network system with content items from the first and second content item sources of the online social network system, the activity data having been stored in an electronic data storage of the online social network system;

the first content item provided based on a first selection metric in relation to the activity data and a value metric;

the second content item being different than the first content item and provided based on a second selection metric in relation to the activity data;

generating first and second utility values for the first and second content items, respectively, based on a mathematical operation applied to the first and second engagement values, respectively, the first and second selection metrics, respectively, and, for the first utility value, the value metric;

determining one of the first and second content items as a push content item based on a difference between the first and second utility values; and causing via a network interface, a user device associated with the member to display the push content item as a push notification.

15. The system of claim 14, further comprising the processor and the network interface.

16. The system of claim 14, further comprising:

determining, with the processor, a user device type of the user device as being one of a plurality of predetermined device types; and determining, with the processor, the push content item based, at least in t, on the user device being the one of the plurality of predetermined device types.

17. The system of claim 16, wherein the predetermined device types are a personal computer device type and a mobile device type.

18. The system of claim 14, further comprising determining, with the processor, a duplication criterion of the push content item, wherein causing a user interface of the user device to display the push content item is based on the duplication criterion having been met.

19. The system of claim 18, further comprising selecting a new push content item based the duplication criterion not having been met.

20. The system of claim 14, wherein the selection metric is a rate at which users are expected to select a corresponding content item.

* * * * *